A. V. BROWN.
EYEGLASS MOUNTING.
APPLICATION FILED AUG. 20, 1910.

1,014,116.

Patented Jan. 9, 1912.

2 SHEETS—SHEET 1.

WITNESSES
Daniel Webster, Jr.
William Conway

INVENTOR
Andrew V. Brown
BY Cyrus N. Anderson
ATTORNEY

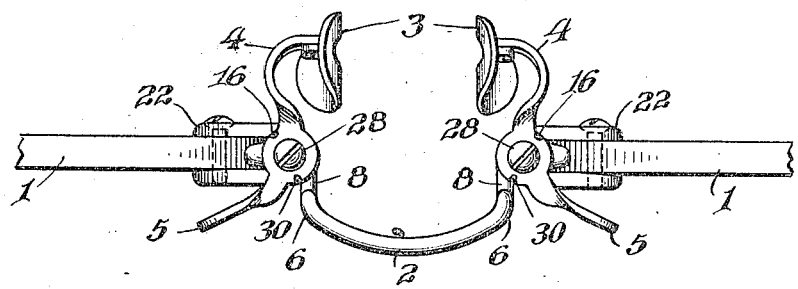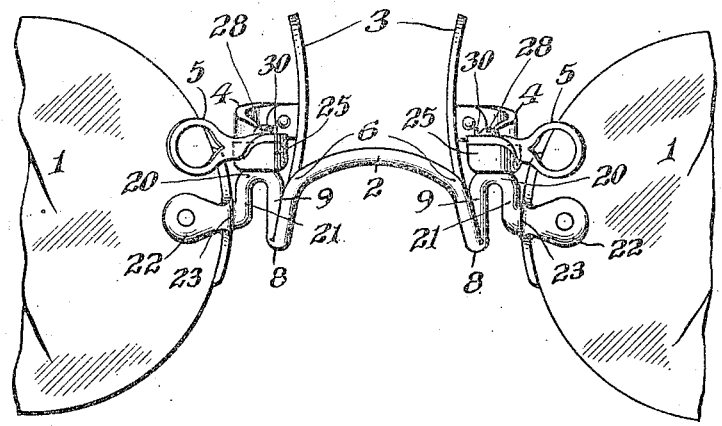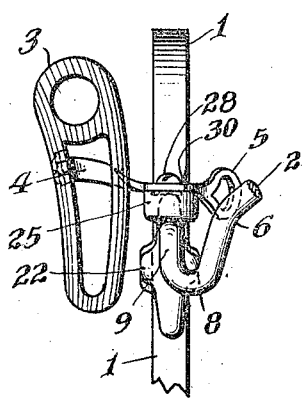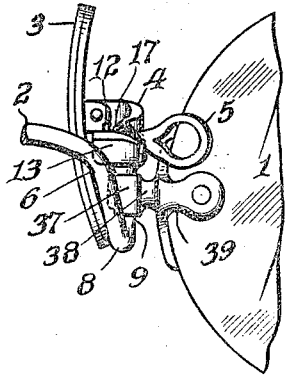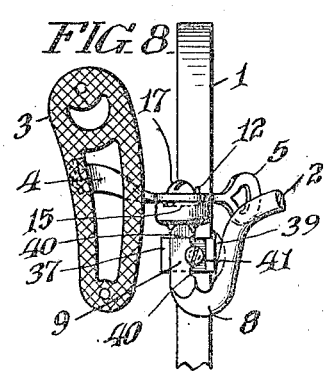

UNITED STATES PATENT OFFICE.

ANDREW V. BROWN, OF PHILADELPHIA, PENNSYLVANIA.

EYEGLASS-MOUNTING.

1,014,116.  Specification of Letters Patent.  Patented Jan. 9, 1912.

Application filed August 20, 1910. Serial No. 578,119.

*To all whom it may concern:*

Be it known that I, ANDREW V. BROWN, a citizen of the United States, residing in the city and county of Philadelphia, State of Pennsylvania, have invented certain new and useful Improvements in Eyeglass-Mountings, of which the following is a specification.

My invention relates to improvements in eye glass mountings of the type commonly known as finger-piece eye-glass mountings and it has for one of its objects the provision of an improved construction in which the bridge which extends between and connects the lenses of the eye glasses is rigid and is adapted to rest upon the nose of the wearer.

A further object of my invention is to provide means whereby the position of the bridge with respect to the lenses and other connected portions of the mountings may be varied so as to position the bridge at that particular point upon the nose at which it is afforded a steady support and to which position the bridge naturally goes, the position varying somewhat as the shape of the nose varies.

Another object of my invention is to provide means whereby the lenses, the guards and the levers upon which the guards are carried may be adjusted so as to vary the pupilary distance between the lenses without disturbing the previous adjustment of the bridge.

A still further object of my invention is to provide means whereby the position of the lenses in a plane coincident with the plane of the lenses may be varied with respect to the eye glass mounting.

Other objects and advantages will be referred to specifically hereinafter or will be apparent from the detailed description of my invention as the same is hereinafter set forth.

Convenient embodiments of my invention are illustrated in the accompanying drawings, but changes in the details of construction and arrangement of the parts so as to embody the same in other forms may be made within the scope of the specification and claims of my application without departing from the same.

Figure 1:
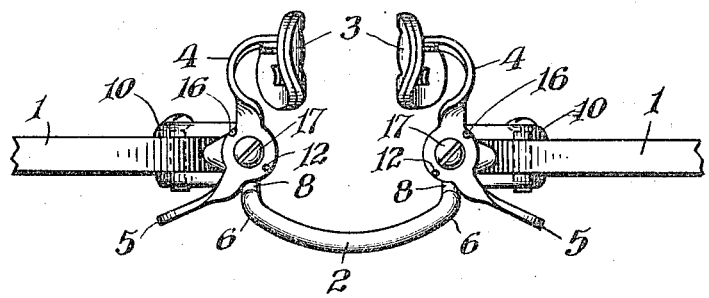
Figure 2:
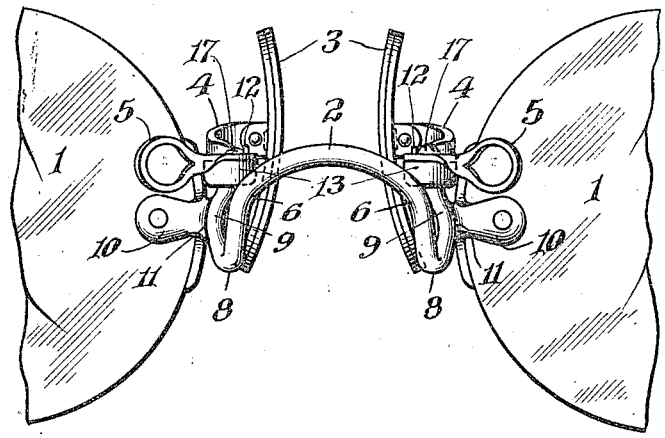
Figure 3:
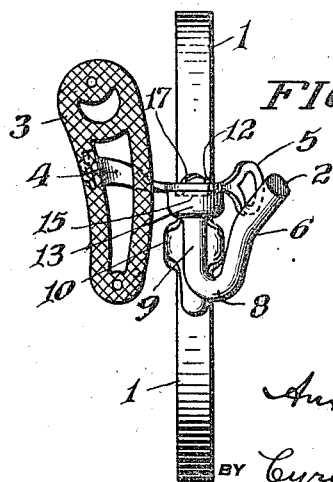

In the drawings,—Figure 1 is a top plan view of a pair of eye glasses embodying my invention; Fig. 2 is a front elevation of the same; Fig. 3 is a central transverse section through the bridge looking toward one of the lenses; Fig. 4 is a top plan view of a modified construction of mounting embodying my invention; Fig. 5 is a front elevation of the same; Fig. 6 is a central transverse section through the bridge looking toward one of the lenses; Fig. 7 is a front elevation of a portion of a lens, one end portion of a bridge and intermediate portions of a mounting showing still another modified construction of my invention; and Fig. 8 is a central transverse section through a bridge looking toward a lense connected to the mounting as shown in Fig. 7.

Referring first to certain parts of the drawings,—1 designates the lenses, 2 the bridge, 3 the guards and 4 pivoted bent levers to which the guards are secured. The levers 4 are operated on their pivots to place the glasses on and remove them from the nose by means of finger piece extensions 5 in the usual manner. The bridge is extended forwardly at an angle from the lenses as indicated in the drawings, particularly in Figs. 3, 6, and 8 thereof and is adapted to rest upon the nose of a wearer as has been stated previously.

For the purpose of facilitating the angular adjustment of the bridge it is provided with a bend at 6 from which point the opposite ends of the bridge extend forwardly and downwardly to points either in alinement with the plane of the lenses or in front of the same and are bent at 8 as shown and are extended upwardly as at 9 to form upright adjustable means to which the lenses may be secured. The angularity of the bridge with respect to the plane of the lenses may be varied also by widening or closing the bends 8. Also by bending the upright adjustable parts outwardly and inwardly in the plane of the lenses the pupilary distance of the latter may be varied.

Referring now to Figs. 1 to 3, inclusive, of the drawings, it will be noted that the lenses are secured to the upwardly extending adjustable parts 9 by means of straps 10 which are soldered at 11 to the said parts 9. It is obvious that the point of attachment by soldering of the straps 10 to the parts 9 may be varied so as to vary the vertical height of the lenses with respect to the bridge and other parts of the eye glass mounting. The levers 4 in Figs. 1 to 3 are pivotally mounted upon the upper ends of the parts 9 and are held in position for the guards or nose bearing parts 3 to clamp the nose by means of springs, the ends 12 of which are shown. The said springs are inclosed in annular box like seats 13 which surround the upper ends of the parts 9. Portions of the upper edges of the box like seats 13 are cut away as indicated at 15. For the purpose of forming stops upon the levers 4, small portions thereof are depressed as indicated at 16 which depressed portions fit into the cut out portions 15 in the box like seats 13 whereby the pivotal movement of the levers 4 is limited. The levers 4 are secured upon the upper ends of the parts 9 by means of screws 17.

Referring now to Figs. 4, 5 and 6, inclusive, of the drawings, it will be observed that the bridge 2 is arranged and extended forwardly at an angle from the plane of the lenses in the same manner as the bridge 2 shown in Figs. 1 to 3 inclusive. It will also be observed that the opposite ends of the bridge extend downwardly to a point slightly in front of or within the plane of the lenses after which it extends upwardly to form the part 9 as stated. The upper ends of the parts 9 in Figs. 4, 5 and 6 are bent outwardly in the plane of its lenses as shown at 20 and then downwardly to form the downwardly extending portions 21 which are connected to straps 22 by soldering or in any other suitable manner as shown at 23. Secured upon the apexes of the bends 20 are sockets or box like casings 25 upon the upper sides of which the levers 4 are pivoted and are secured thereto by means of screws 28. As in the construction shown in Figs. 1 to 3, inclusive, springs, the ends of which are shown at 30, are located inside of the said box like casings 25 and actuate the levers to hold the guards 4 in their innermost or clamping position. By providing the downwardly extending portions 21 it will be observed that I have provided an additional means for effecting adjustment of the lenses in the direction of their planes to that shown in Figs. 1 to 3 inclusive so that the range of adjustment is materially increased. The said downwardly extending parts also afford additional means of adjustment forwardly and rearwardly.

In Figs. 7 and 8 I have shown a construction in which the rigid bridge 2 is inclined upwardly and forwardly from the plane of the lenses in the same or substantially the same manner as is shown in Figs. 1 to 3 inclusive of the drawings. The opposite ends of the bridge are bent and extended forwardly and downwardly to the bends 8 and are thence extended upwardly to form the upwardly extending parts 9 as stated. In the construction shown in these Figs. 7 and 8, the upright parts 9 extend through boxes 37 upon posts or studs 38 connected by means of straps 39 to the lenses in the usual manner. The upwardly extending parts 9 are provided with notches 40 which are adapted to engage the sides of screws 41 by means of which the bridge member of the mounting is connected to the boxes 37. A plurality of such notches are provided so that the lenses may be readily adjusted vertically in the direction of their plane as may be desired.

Having thus described my invention, I claim:—

1. In eye glasses, in combination, lenses, a bridge, the said bridge extending upwardly and forwardly from the plane of the said lenses and the said bridge at its opposite end portions and anteriorly of the lenses being provided with bends and the said bridge beyond the said bends extending downwardly to a point in front of the plane of said lenses and the ends of the said bridge being then bent rearwardly and extended upwardly in the plane of the said lenses, means for connecting the said lenses to the said upwardly extended portions and guard supporting means pivotally connected to the said upwardly extending portion.

2. In eye glasses, in combination, lenses, a rigid bridge having its opposite ends connected to the said lenses, the said bridge extending upwardly and forwardly from the plane of the said lenses, the opposite end portions of the body of said bridge extending downwardly to a point in front of or in the plane of said lenses, and the opposite ends being then bent and extended upwardly in the plane of the said lenses, means for connecting the said lenses to the said upwardly extended portions and guard supporting means pivotally supported upon the upper ends of the said upwardly extending portions.

3. In eye glasses, in combination, lenses, a rigid bridge extending forwardly from and at an acute angle to the plane of the said lenses, the said bridge upon opposite sides of its central portion extending downwardly and rearwardly to a point slightly in front of the plane of the lenses and being then bent and extended upwardly in the plane of the lenses, spring pressed levers pivotally supported upon the said upwardly extended portions, guards secured upon the rear ends of the said levers and the said levers having forwardly extended finger portions and means for connecting the said lenses to the said upwardly extending portions.

4. In eye glasses, in combination, lenses, a rigid bridge having connection at its opposite ends with the said lenses, the said bridge extending upwardly from and at an acute angle to the plane of the said lenses and being provided with bends at its opposite ends, which bends are located at points below the point of connection of the lenses to the said bridge and the opposite ends of the bridge beyond the bends extending upwardly means for connecting the said lenses to the said bridge and guard supporting means pivotally connected to the opposite ends of the said bridge.

5. In eye glasses, in combination, lenses, a rigid bridge having connection at its opposite ends to the said lenses, the opposite end portions of the body of the said bridge extending rearwardly and downwardly at an angle to the plane of the said lenses and having rearwardly extended bends at points below the major axes of the said lenses beyond which bends the ends of the said bridge extend upwardly, posts or standards secured to the said lenses, which posts or standards are provided with boxes or housings in their ends in which the upwardly extended end portions of the said bridge are seated, and means for securing the said end portions in the said boxes or housings and spring pressed guard carrying means pivotally secured to the opposite ends of the said bridge.

6. In eye glasses, in combination, lenses, a rigid bridge having connection at its opposite ends to the said lenses, the opposite end portions of the body of the said bridge extending rearwardly and downwardly at an angle to the plane of the said lenses and having rearwardly extended bends at points below the major axes of the said lenses beyond which bends the ends of the said bridge extend upwardly, the said upwardly extended portions having notches therein, posts or standards secured to the said lenses, which posts or standards are provided with boxes or housings in their ends in which the upwardly extended end portions of the said bridge are seated and screws for engaging the said notches and securing the said end portions in the said boxes or housings.

In testimony that I claim the foregoing as my invention, I have hereunto signed my name this 19th day of August, A. D. 1910.

ANDREW V. BROWN.

In the presence of—
 CYRUS N. ANDERSON,
 CHAS. H. ULERY.